Patented May 10, 1927.

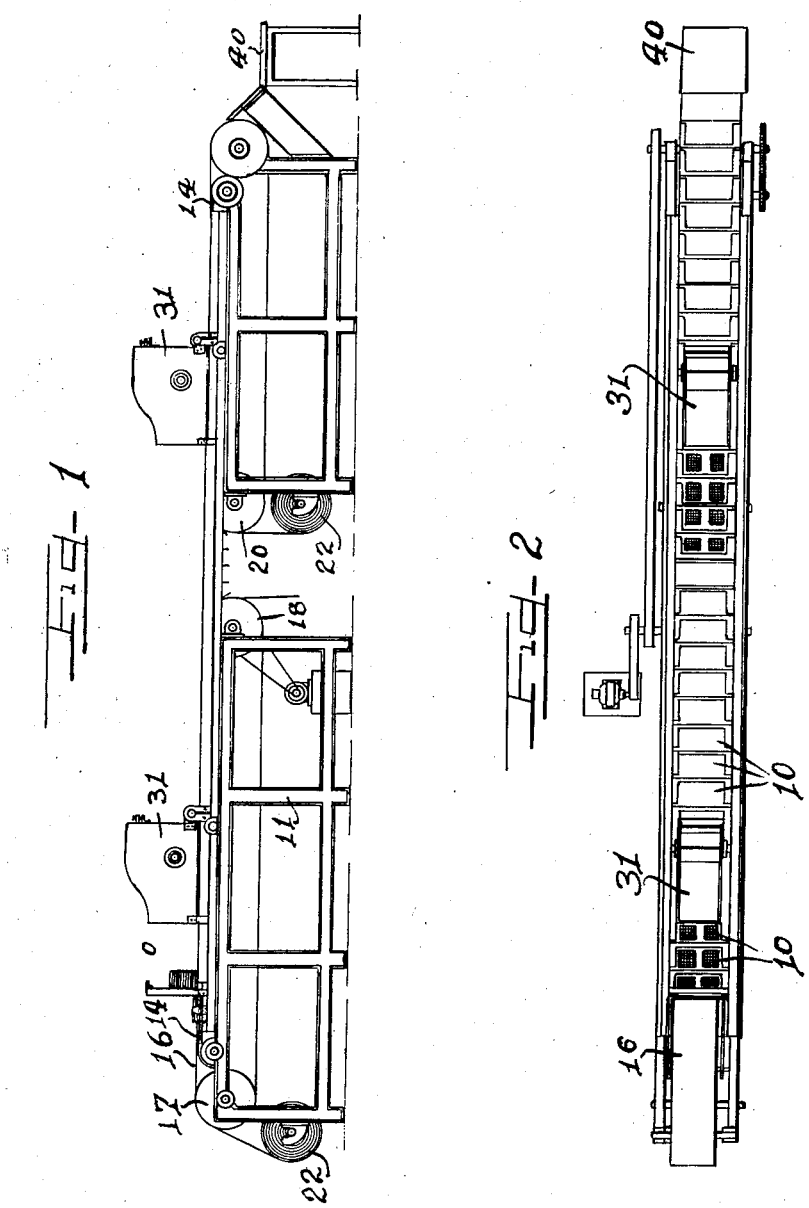

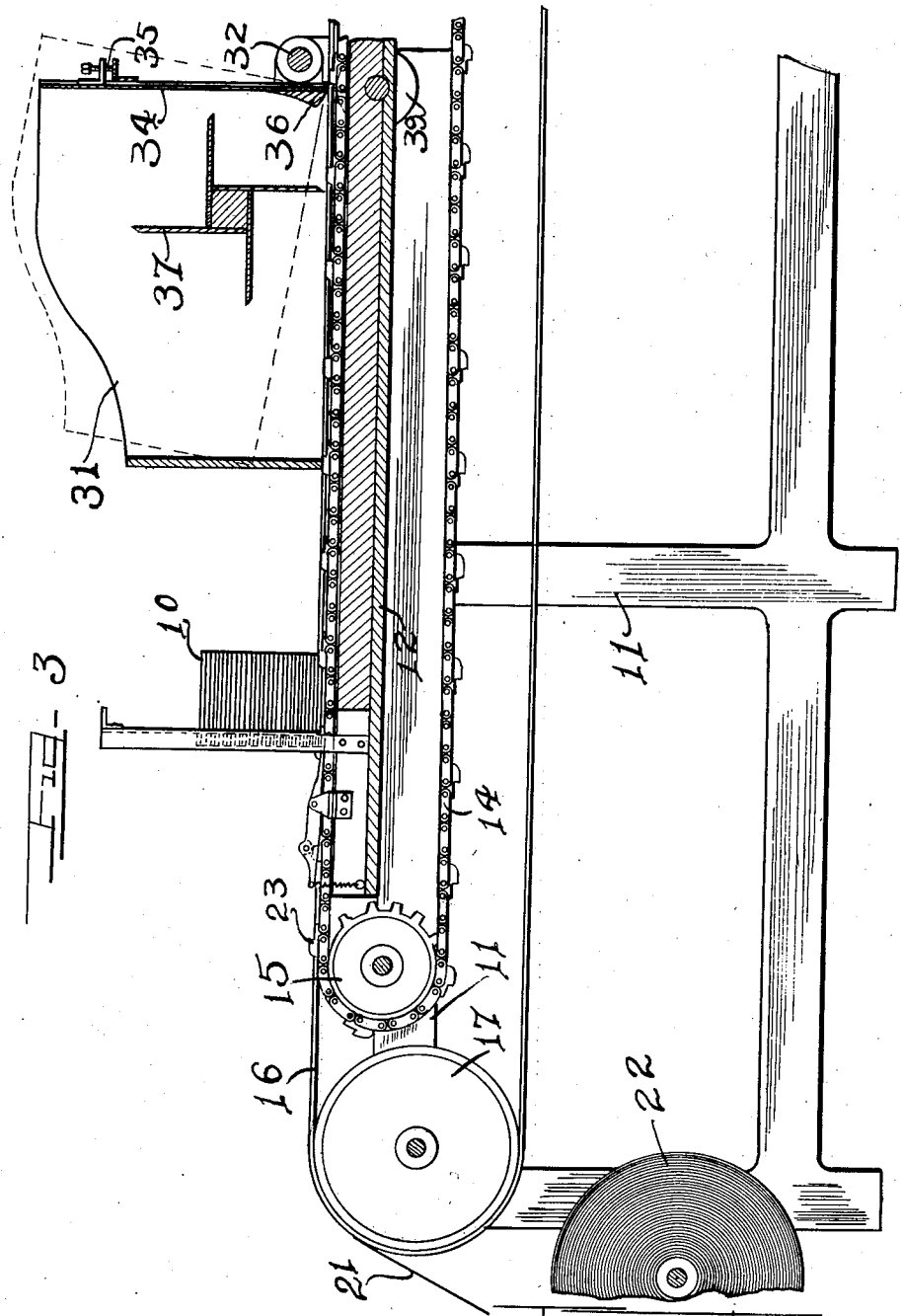

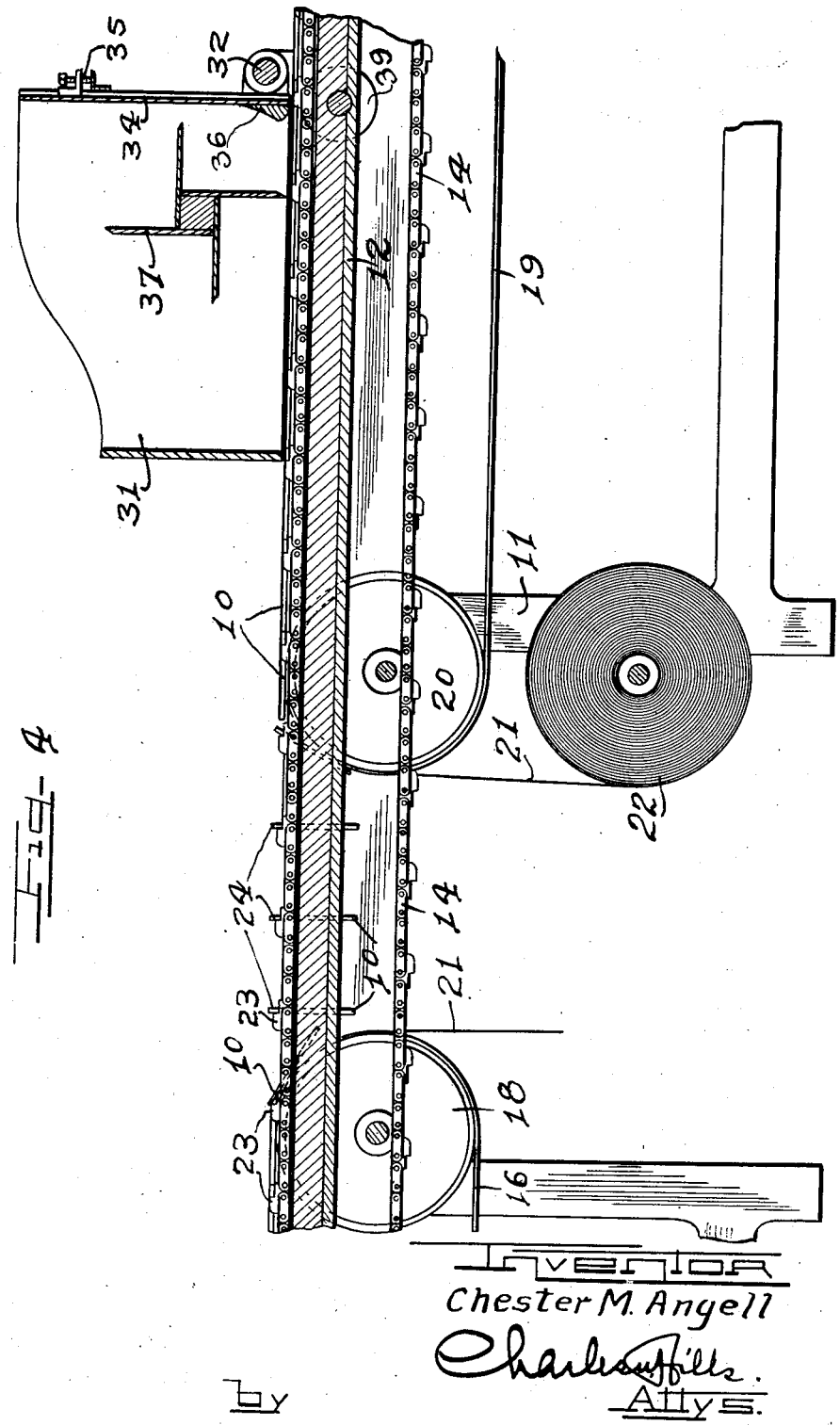

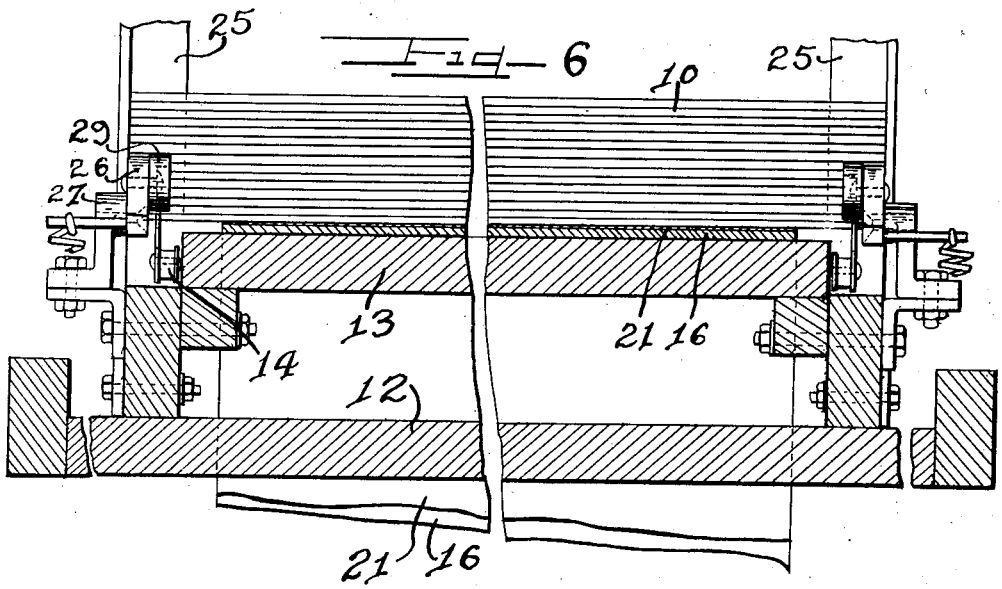
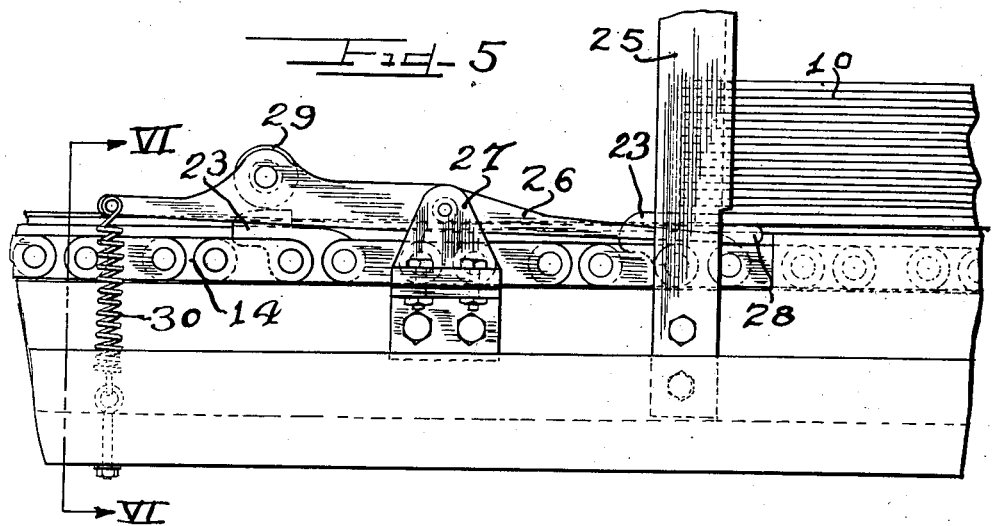

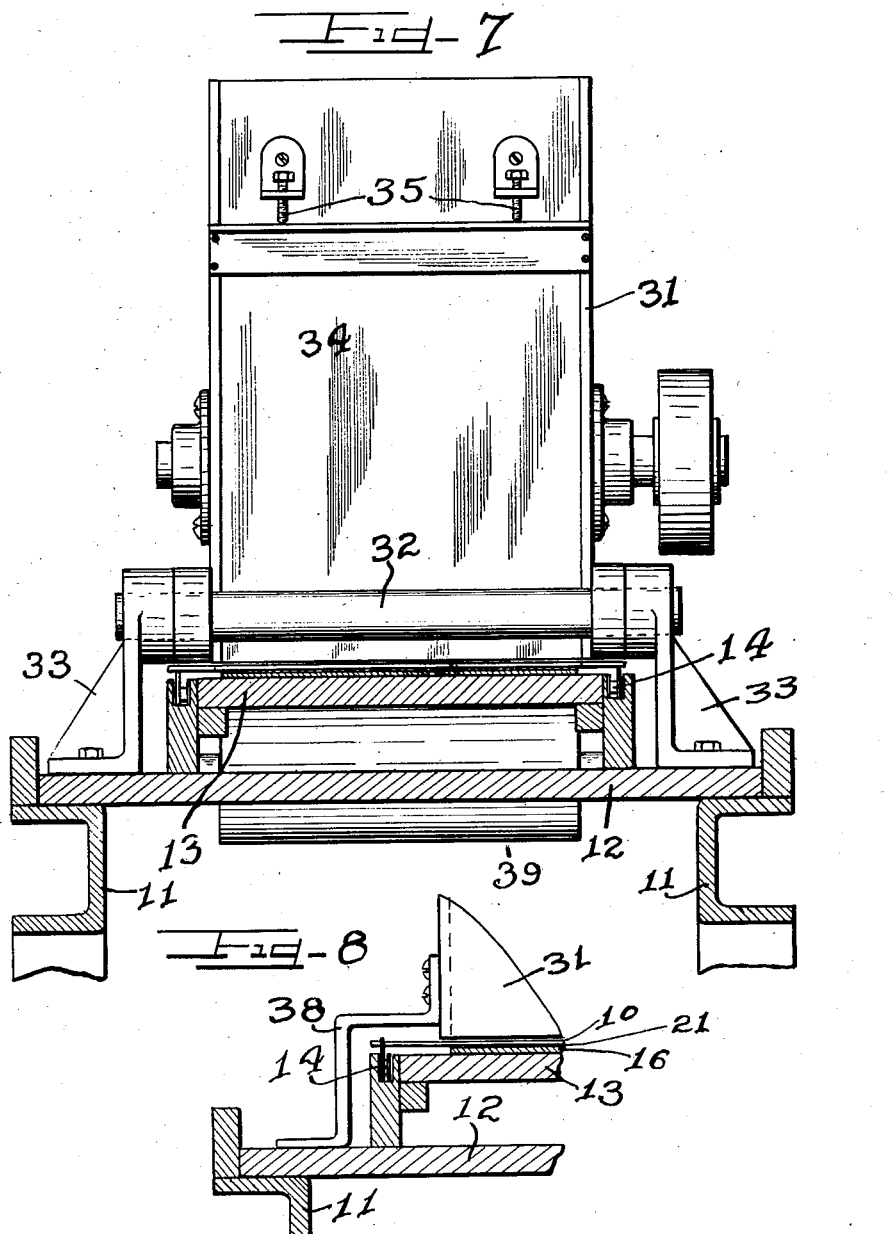

1,627,763

UNITED STATES PATENT OFFICE.

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS.

BATTERY-PLATE-FILLING MACHINE.

Application filed February 7, 1925. Serial No. 7,490.

This invention relates to a machine for filling storage battery plates or grids with the paste-like compound forming the active principle of the battery.

It is an object of this invention to provide an improved machine for filling the grids with paste.

It is also an object of this invention to provide improved feeding means for the grids prior to the filling operation.

It is another object of this invention to provide improved means for successively applying paste to opposite sides of a grid.

It is a further object of this invention to provide an improved paste applying mechanism.

Other and further important objects of this invention will be apparent from the disclosures in the specification and the accompanying drawings.

The invention, in a preferred form, is illustrated on the drawings and hereinafter more fully described.

On the drawings:

Figure 1 is a side elevation of a complete machine embodying features of this invention.

Figure 2 is a plan view thereof.

Figure 3 is an enlarged sectional elevation of the left hand end of the machine showing the grid feeding mechanism and first paste box.

Figure 4 is an enlarged sectional elevation of the grid reversing mechanism and second paste box.

Figure 5 is a fragmentary enlarged elevation of the grid feeding mechanism.

Figure 6 is a section on the line VI—VI of Figure 5.

Figure 7 is an enlarged rear view of the paste box showing the adjustable scraper mounting and pivots for the box.

Figure 8 is a detail section showing the supports for the front part of the paste box.

As shown on the drawings:

The general method involved in this invention comprises stacking and feeding individual grid blanks 10 through a paste-applying mechanism, then reversing the grids and passing them through a duplicate paste-applying mechanism to assure even application of the paste to both sides of the grids. To accomplish these results automatically, one machine incorporates the necessary elements into a coacting whole.

A table or platform 12 is supported on suitable standards 11 and supports a second platform 13 thereabove along either side of which synchronized conveyor chains 14 are trained, the chains running over sprocket wheels 15 at either extremity of the platform 13 and returning beneath the platform. A conveyor belt 16 runs over the second platform 13 between and in timed relationship to the chains 14. This belt is trained over the pulleys 17 and 18, the latter adjacent the center of the machine as a whole, so that the belt 16 supports the grids only through the first paste applying mechanism.

A second conveyor belt 19 similarly runs over the second half of the platform 13, the leading pulley 20 for this belt being spaced sufficiently from the trailing pulley 18 of the first belt 16 to allow the grids 10 to drop down off the first belt and hang from the chain 14 until picked up by the second belt in a reverse or turned over position as indicated in Figure 4. Because of the paste deposited on the belts in the interstices between grids it is desirable to run paper 21 from rolls 22, over each belt, the paper being wasted after recovering the paste.

The conveyor chain 14 carries a series of combined dogs and cams 23, the dogs engaging the lugs 24 of the grids 10 to propel the same and the cams or humps of the dogs serving to actuate a feeding mechanism delivering one grid at a time to the conveyor belt and chain. The feeding mechanism comprises a stacking device 25 adapted to receive a pile of grids and retain all but the lowest one by engaging the lugs of the balance. A trip lever 26 is pivoted at 27 and carries a detent 28 normally restraining the lowermost grid by engaging the lug thereof. The opposite end of the lever carries a roller 29 adapted to be lifted by one of the cam dogs when another one of the dogs is in a position to receive the grid lug and advance the same, the movement of the lever 26 serving to release the detent 28 from the grid lug. A spring 30 returns the lever into engaging position with the next grid lug as soon as the cam 23 passes beyond the roller 29. The spacing of the dogs 23 is such that grids follow each other as closely as is practically possible to reduce the waste of paste in the paste applying apparatus.

The paste box 31 proper is pivoted at its rear on the shaft 32 supported in brackets 33 on the table. The rear wall 34 of the box is adjustable vertically by means of the set screws 35 and the inner bottom edge thereof carries a finishing slice 36 tending to smoothly apply the paste and remove the excess paste from the grids. An agitator or beater 37 is traversely mounted within the box and the revolving blades thereof serve to force the paste into the interstices of the grids. By disconnecting the beater drive belt the whole box may be tilted up and back to facilitate cleaning. In its operative position the front end of the box is supported by brackets 38 straddling the conveyor platform as shown in Figure 8. A roller 39 is provided flush with the surface of the conveyor platform and immediately below the slice 36 to take the thrust and save wear of the conveyor belt due to the extra pressure imposed thereon at this point.

The operation is as follows:

A stack of grids is placed in the grid feeding mechanism with the lowermost grid lugs held back by the detents 28 on the levers 26 hooking beneath the lugs on the grid. The conveyor belt with the superimposed paper, and the conveyor chains, advance in synchronism, the cam dogs on the chains tripping the levers 26 to deposit single grids on the paper covered belt with the grid lugs in position to be driven by the cam dogs immediately preceding the pair of cam dogs that trip the lever. Therefore, each grid is individually moved through the machine by a pair of dogs.

After being deposited on the conveyor the grids pass in succession through the first paste box where the paste is worked into the grid and the excess scraped off by the adjustable rear wall of the box. After emerging from the box the first conveyor belt ends and the grids drop by gravity, hanging from their lugs from the cam dogs as pivots. Upon reaching the second conveyor belt the grids are brought back to a horizontal position in a reversed or trailing position and then pass through the second paste box to finish both sides of the grid. From the second conveyor the grids slide onto an inspection table 40 where the workman can smooth out the surfaces and fill in cavities to reclaim grids with defective fillings.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a machine of the class described a table, a conveying means adapted to individually advance a plurality of grids in unison, a pair of supporting conveyors adapted to support said grids in a horizontal position, said grids adapted to be moved off the first conveyor by the conveying means and delivered thereby to the second conveyor in a reversed position.

2. In a machine of the class described a table, a conveying means adapted to individually advance a plurality of grids in unison, a pair of supporting conveyors adapted to support said grids in a horizontal position, said grids adapted to be moved off the first conveyor by the conveying means and delivered thereby to the second conveyor in a reversed position, means adapted to feed said grids singly to the conveying means, and means for applying paste to the grids while on each conveyor.

3. In a machine for handling plate grids, a platform, a stacking means for the grids, a paste box above said platform, means normally restraining the lowermost grid in said stacking means, means adapted to release said restraining means and remove said lowermost grid, and means for advancing the grids through the paste box.

4. In a machine for handling plate grids, a platform, a stacking means for the grids, a pair of paste boxes above said platform, means normally restraining the lowermost grid in said stacking means, means adapted to release said restraining means and remove said lowermost grid, means for advancing the grids through the first paste box, and means for reversing the grids and passing them through the second paste box.

5. In a machine for handling battery plate grids, stacking means to position the lugs of said grids, a chain conveyor, cam dogs thereon adapted to engage the lugs of the lowermost grid, a detent lever normally restraining said lowermost grid and adapted to be released by one of the cam dogs when another one of said dogs engages the lugs of said grid to advance the same.

6. In a machine for handling battery plate grids, stacking means to position the lugs of said grids, a chain conveyor, cam dogs thereon adapted to engage the lugs of the lowermost grid, a detent lever normally restraining said lowermost grid and adapted to be released by one of the cam dogs when another one of said dogs engages the lugs of said grid to advance the same, a conveyor belt supporting said grids during their movement, and a second conveyor belt supporting said grids in a reversed position after leaving the first conveyor belt.

7. In a machine for handling battery plate grids, stacking means to position the lugs of said grids, a chain conveyor, cam dogs thereon adapted to engage the lugs of the lowermost grid, a detent lever normally restraining said lowermost grid and adapted to be released by one of the cam dogs when another one of said dogs engages the lugs of said grid to advance the same, paste boxes for applying paste to either side of said grids in succession, and means for reversing said grids between said paste boxes.

8. In a machine of the class described, a conveyor belt adapted to advance individual grids, a paste box positioned above said conveyor, a slice on the rear edge of said box adapted to compress and remove excess paste from said grids and a roll positioned beneath said conveyor in line with the rear edge of said paste box to support the conveyor against the downward pressure of said slice.

In testimony whereof I have hereunto subscribed my name.

CHESTER M. ANGELL.